United States Patent [19]

Nakanishi

[11] 4,389,158
[45] Jun. 21, 1983

[54] TURBO COMPRESSOR HAVING A SURGE SUPPRESSING ARRANGEMENT

[75] Inventor: Keiichi Nakanishi, Yokohama, Japan

[73] Assignee: Nissan Motor Co., Ltd., Yokohama, Japan

[21] Appl. No.: 265,329

[22] Filed: May 20, 1981

[30] Foreign Application Priority Data

Jun. 6, 1980 [JP] Japan .................................. 55-75440

[51] Int. Cl.³ ........................ F01B 25/02; F01B 25/04; F01B 25/06
[52] U.S. Cl. .................................. 415/148; 415/151; 415/163
[58] Field of Search ........................ 415/163, 151, 148; 74/469, 515

[56] References Cited

U.S. PATENT DOCUMENTS

| | | | |
|---|---|---|---|
| 1,540,423 | 6/1925 | Rees | 415/163 |
| 1,706,327 | 6/1926 | Anderson | 415/163 X |
| 1,750,400 | 4/1928 | Gibbs et al. | 415/163 |
| 3,007,675 | 11/1961 | Suss | 415/151 X |
| 3,861,822 | 1/1975 | Wanger | 415/151 X |
| 4,003,200 | 1/1977 | Zerlauth | |
| 4,167,368 | 9/1979 | Brobeck | 415/163 X |
| 4,275,560 | 6/1981 | Wright et al. | 415/148 X |

FOREIGN PATENT DOCUMENTS

| | | |
|---|---|---|
| 233722 | 5/1964 | Austria . |
| 982583 | 6/1951 | France . |
| 991444 | 5/1965 | United Kingdom . |
| 631684 | 11/1978 | U.S.S.R. ............................ 415/163 |
| 750139 | 7/1980 | U.S.S.R. ............................ 415/151 |

Primary Examiner—Billy J. Wilhite
Assistant Examiner—Shewen Bian
Attorney, Agent, or Firm—Thompson, Birch, Gauthier & Samuels

[57] ABSTRACT

A series of airfoil cross-section equidistantly spaced normally parallel vanes are disposed linearly across the mouth of an induction housing port which lies on an essentially flat plane non-intersecting with the axis of rotation of a turbo compressor wheel. A control mechanism moves the vanes upon the compressor tending to surge so that each of the vanes is moved through an angle different from the preceeding one, whereby the air flows passing between the vanes are deflected and converge upstream of the compressor wheel and swirl theretoward in the form of a single flow to impinge on the blades of the wheel with a uniform and reduced angle of incidence.

8 Claims, 7 Drawing Figures

TURBO COMPRESSOR HAVING A SURGE SUPPRESSING ARRANGEMENT

BACKGROUND OF THE INVENTION

1. Field of the Invention

The present invention relates to a compressor and more specifically to a turbo compressor for a gas turbine or the like, equipped with an improved surge limit suppressing arrangement.

2. Description of the Prior Art

In order to suppress or lower the surge limit of a turbo compressor it is know to swirl the inducted air flow upstream of the turbo compressor wheel when the induction volume falls to a level at which surging is apt to occur. This reduces the angle of incidence of the incomming flow of air on the blades of the compressor wheel suppressing the surge limit.

A known arrangement utilized for controllably swirling the incomming flow of air upstream of the turbo compressor wheel 1 is shown in FIGS. 1 and 2. This arrangement takes the form of a series of equidistantly spaced vanes 2 disposed radially about the axis of rotation of the turbo compressor 1. Each of the vanes 2 is pivotally mounted on a shaft 3 provided at one end with a connection link or lever 4. A ring member 5 is operatively connected to each of the links 4 and so that upon rotation of same each of the vanes 2 undergoes the same degree of deflection from its home or neutral position. However, when this arrangement is applied to the illustrated type of gas turbine, viz., a gas turbine having an induction port asymmetrical with respect to the axis of rotation of the turbo compressor wheel wherein the port lies in an essentially flat plane which is tangential to and non-intersecting with the turbo compressor wheel axis, the flow path from the "asymmetrical" induction port to the guide vanes closest thereto is shorter than those successively spaced therefrom. Further, due to the configuration of the induction port the angle of entry of the flows between the vanes tends to vary along with the generation of a flow velocity differential between adjacent vanes. These flow velocity differentials between the vanes tends to induce the situation wherein the flow velocity on one side of a vane is different from that on the other, whereupon a pressure differential occurs at the trailing edge of the vane which in turn produces turbulent or eddy flow downstream thereof. This turbulent flow creates a vibration which under given operational conditions tends to maximize or resonate to the degree of damaging the blades 6 of the compressor. Moreover, the differing angles of entry of the flows between the vanes induces the situation wherein the angle of incidence of the air on the blades of the compressor is not uniform and accordingly deviates across the face of the compressor wheel from the desired value for any given low induction mode of operation.

Moreover, the construction of the just described arrangement is complex and difficult to install in the confined space available in an induction housing having an "asymmetrical" port.

SUMMARY OF THE INVENTION

The present invention features a plurality of spaced linearly arranged vanes which span the asymmetrically arranged mouth of the induction port of a turbo compressor induction housing and which assume positions parallel to one and other when in their home or "non-swirl inducing" positions. A linkage system is provided which, when activated moves each of the vanes through an angle different with respect the others. Thus, when the induction volume of the turbo compressor approaches the surge limit the vanes are moved by the linkage system to direct the flow passing between adjacent vanes so that they converge upstream of the compressor wheel into a single laminar flow which impinges on the blades thereof with a uniform and reduced angle of incidence and in a manner which actually tends to accelerate the compressor wheel. Moreover, as the vanes are disposed at the mouth of the induction housing the turbulence and flow path length problems inherent in the prior art are eliminated.

BRIEF DESCRIPTION OF THE DRAWINGS

The features and advantages of the arrangement of the present invention will become more clearly apreciated from the following description taken in conjunction with the accompanying drawings in which.

DETAILED DESCRIPTION OF THE PREFERRED EMBODIMENTS

Figure 1:
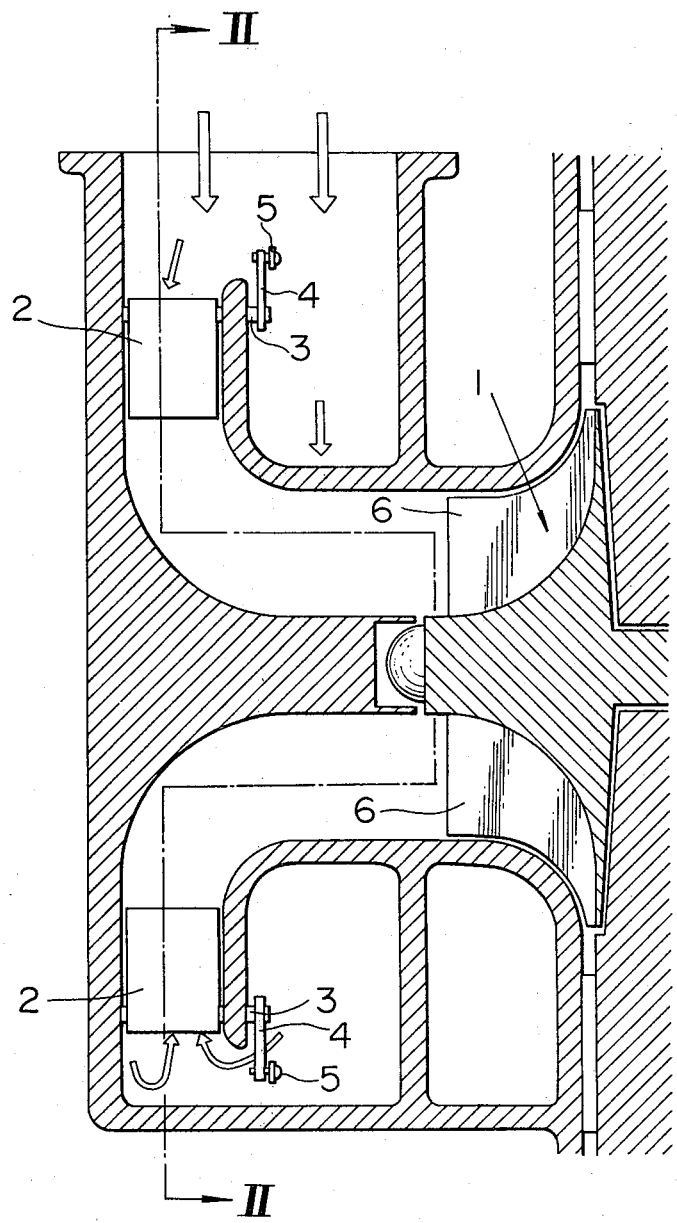
FIG. 1 is a longitudinal cross section of a turbo compressor equipped with a swirl generating arrangement as discussed briefly under the heading of "Description of the Prior Art;"
Figure 2:
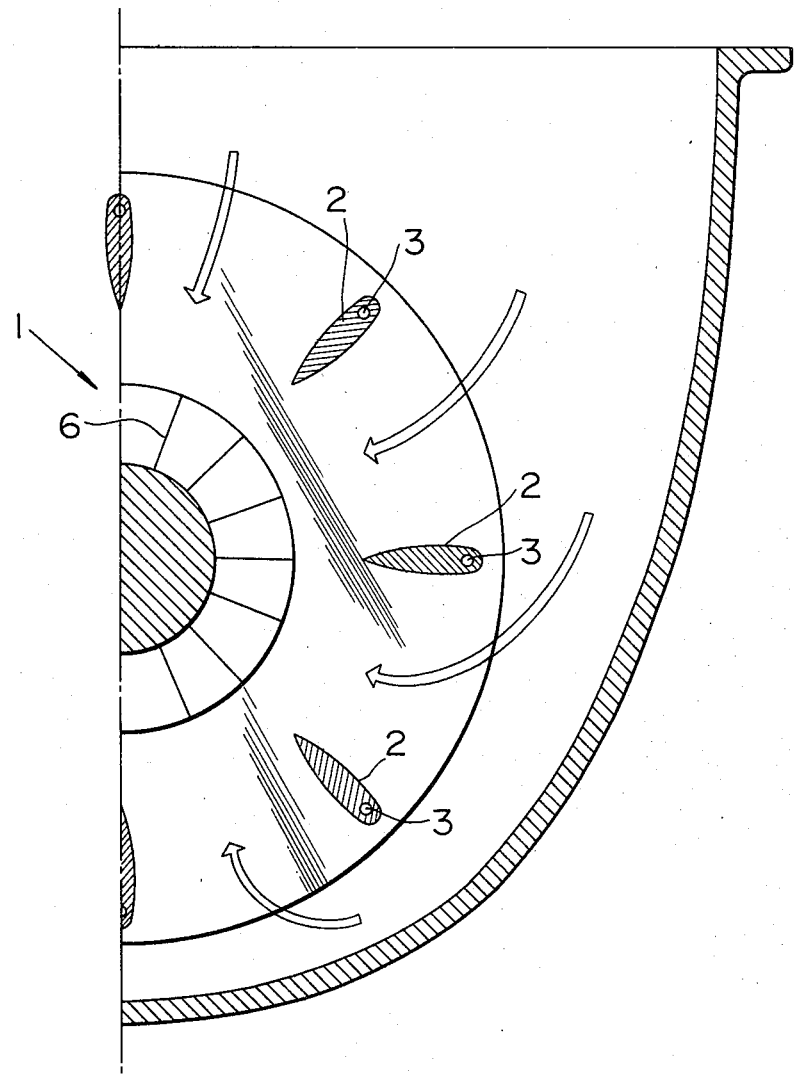
FIG. 2 is a sectional view taken along section line II—II of FIG. 1.
Figure 3:
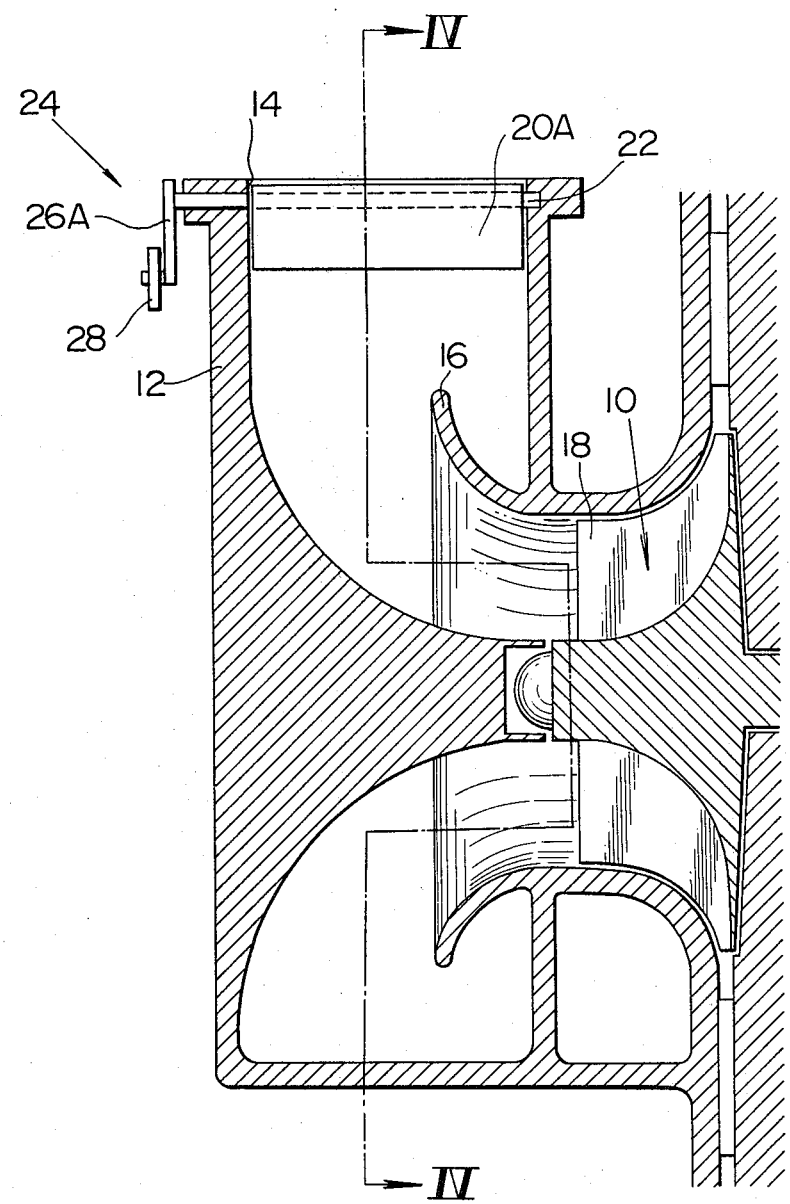
FIG. 3 is longitudinal cross section of a turbo compressor equipped with a preferred embodiment of the present invention.
Figure 4:
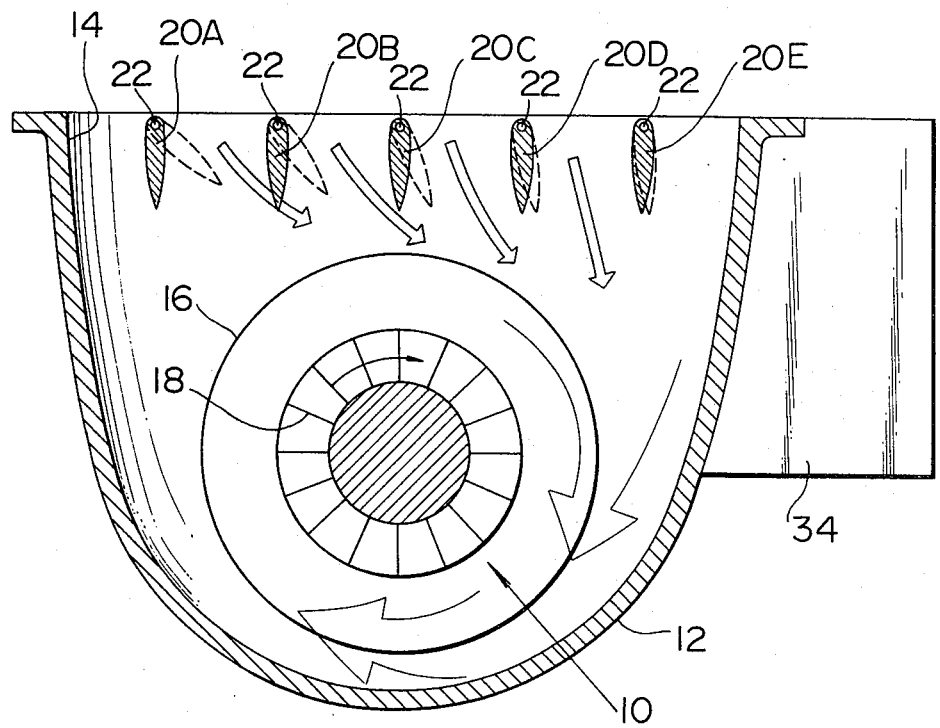
FIG. 4 is a sectional view taken along section line IV—IV of FIG. 3.

Turning now to the drawings and more particularly to FIGS. 3 and 4 a basic arrangement of the preferred embodiment is shown. In this arrangement the turbo compressor wheel 10 is operatively disposed in an induction housing 12 having a single "asymmetrically" arranged induction port 14. The induction housing 12 is also formed with a bell or trumpet like member 16 therein for promoting laminar flow toward the blades 18 of the compressor wheel. Disposed equidistantly across the induction port or mouth 14 is a series of five (by way of example) airfoil cross-section guide vanes 20A to 20D which are arranged so that the upstream and downstream edges thereof are parallel with the axis of rotation of the compressor wheel 10. In their home or "non-swirl inducing" positions, each of the vanes are parallel with each other.

Figure 5:
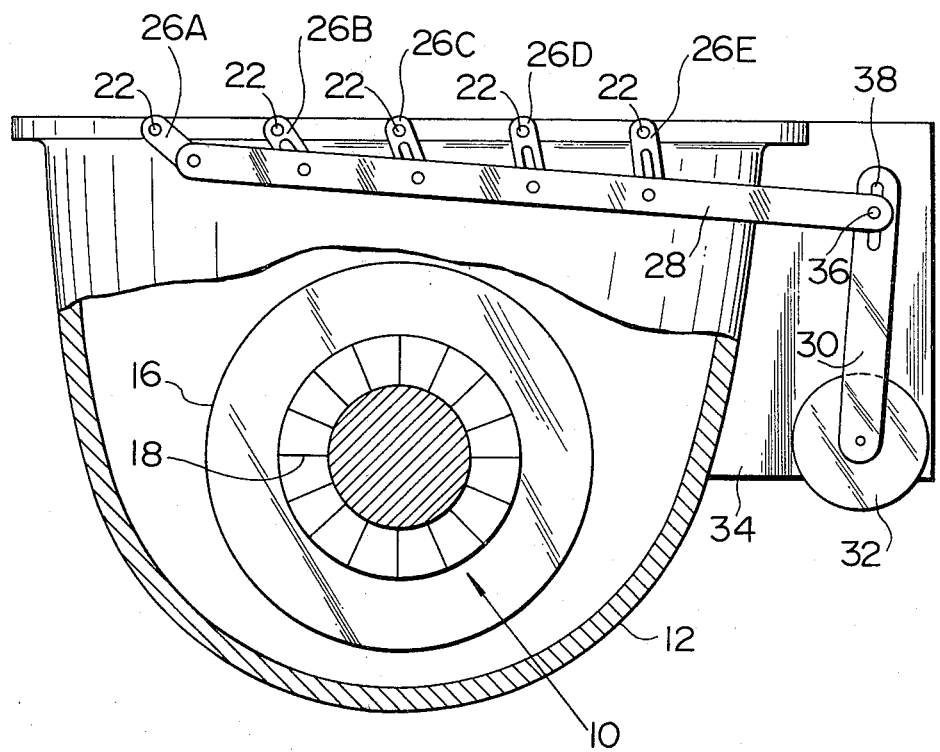
FIG. 5 is a partially sectioned front elevational view showing a control linkage employed in the preferred embodiment.

Each of the vanes is pivotally supported in the housing 12 on a pivot shaft 22, one end of which projects out of the induction housing 12 for connection with a control mechanism generally denoted by the numeral 24. Fixed to the ends of the pivot shafts 22 and parallel with the corresponding guide vanes are links or levers 26A to 26D. As shown in FIG. 5 each of the links is of a different length and each pivotally connected to a connecting arm 28 at different distances from the axis the pivot shafts. In this case the distance between the axis of of the pivot shaft and that of the pin interconnecting the connecting arm with the link in question is the smallest in the case of link 26A and consecutively increases arithmetically from link to link thereafter.

The connecting arm 28 is connected at one end to a slotted drive lever 30 via a pin 36 fixed to the link arm and which slides in the slot 38 in the drive lever 30. An actuator 32 which in this case is hydraulic is mounted on a mounting flange 34 extending from one side of the induction housing 12. This actuator is adpated to rotate the drive lever in response to a control signal in the clockwise direction to draw the connecting arm 28 to the right (as seen in the drawings) accordingly rotating each of the links 26A to 26D. However, due to the different lengths of the links the associated vanes are not rotated through the same angle and as best shown in FIG. 4 the vane 20A furthest from the actuator is, due to the shortness of the link 26A rotated the most, the subsequent vanes 20B to 20D being rotated through progressively smaller angles due to the stepwisely increasing lengths of the associated links 26B to 26D.

Thus, the flows passing between adjacent vanes are directed as shown in FIG. 4 to converge and swirl as a single flow toward the compressor wheel.

In operation, as the induction volume falls toward the surge limit, the actuator 32 is actuated via a suitable control signal indicative of the normal surge limit being approached, to start moving the guide vanes from their normally parallel orientation so as to initiate the swirling necessary for suppressing the surge which is apt to occur.

Figure 6:
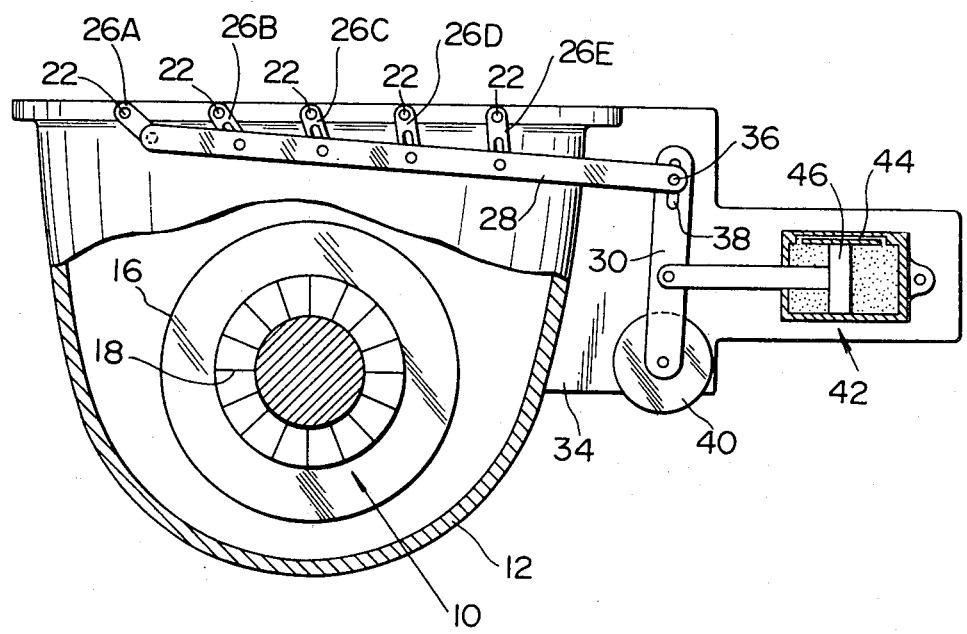
FIG. 6 is a front elevational view similar to FIG. 5 showing the provision of a dash-pot for preventing the flow control vanes from "hunting.

FIG. 6 shows the present invention having a control mechanism employing a pneumatic actuator 40. This actuator may actuated in response to a pressure signal originating on the discharge side of the compressor wheel. However, under such circumstances it is preferable to also provide a dash-pot arrangement 42 for preventing the occurance of a hunting phenomenon apt to take place due to the pneumatic control. The illustrated dash-pot is of the double acting type which pumps a working fluid back and forth through a flow restriction 44 in accordance with the stroking of a piston 46 operatively connected to the drive lever 30.

Figure 7:
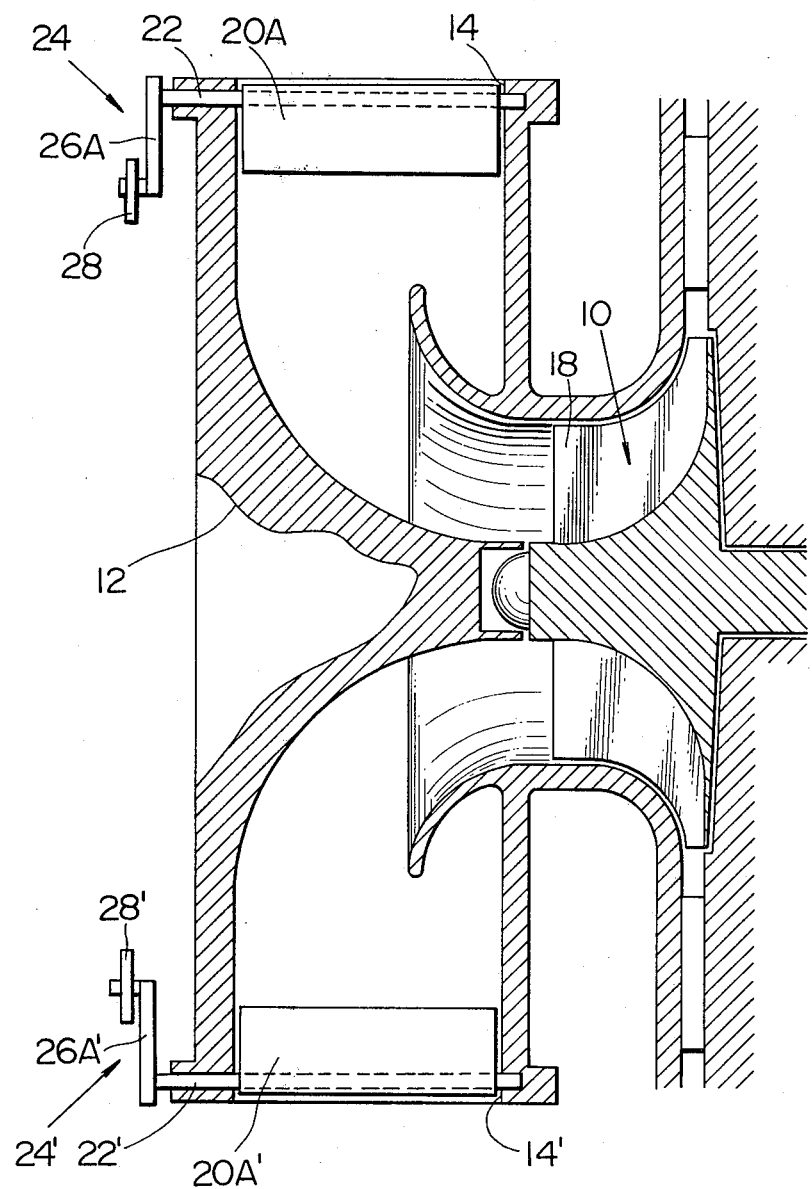
" and FIG. 7 shows the preferred embodiment of the present invention as applied to a turbo compressor having multiple assymmetical induction ports.

FIG. 7 shows a the present invention as applied to a dual "asymmetrical" induction port type turbo compressor. The construction and operation of this arrangement is identical with that previously disclosed with the exception that two set of the guide vanes, one for each induction port are required. Via the provision of a suitable linkage system it is possible to utilize a single actuator for both sets of vanes thus eliminating any possibility of deviation between the control of the two sets of vanes.

Thus in summary, the present invention provides an arrangement which is both simple and easy manufacture and requires installation only in the mouth of the induction port of the compressor housing rather than circumferentially about the axis of the compressor wheel. The invention also allows the axial length of the compressor to remain virtually unchanged as different from the case wherein a single annular type vane is disposed about the compressor wheel axis.

What is claimed is:

1. In a turbo compressor having a compressor wheel disposed in an induction housing and an induction port which lies in an essentially flat plane non-intersecting with the axis of rotation of said compressor wheel, the combination of:
   a plurality of spaced normally parallel vanes disposed across said induction port; and
   a control mechanism which moves each of said vanes through an angle different from the other, said mechanism being activated in response to said compressor tending to surge so that the air is swirled in said induction housing upstream of said compressor wheel and impinges on said compressor wheel with a uniform and reduced angle of incidence.

2. A combination as claimed in claim 1, wherein each of said vanes has a pivot shaft and a link fixed to one end of said pivot shaft;
   and wherein said control mechanism includes an actuator;
   a drive lever rotatable by said actuator; and
   a connecting arm operatively connected to said drive lever, said connecting arm being pivotally connected to each of said links but at a different distance from the axis of said pivot shaft.

3. A combination as claimed in claim 2, wherein said connecting arm is connected to each of said links at a distance which sequentially increases arithmetically from one end of said plurality of vanes to the other.

4. A combination as claimed in claim 2, wherein said actuator is pneumatic and has a dash-pot arrangement connected thereto to prevent hunting.

5. A combination as claimed in claim 4 wherein said actuator is responsive to a pressure signal originating on the discharge side of said compressor wheel.

6. A combination as claimed in claim 1, wherein each of said vanes has an airfoil cross-section.

7. In a turbo compressor having a compressor wheel disposed in an induction housing and an induction port which lies in a plane non-intersecting with the axis of rotation of said compressor wheel,
   a plurality of spaced uniformly shaped and sized pivotal vanes disposed across said induction port; and
   control means operatively connected to each of said vanes for moving said vanes from home positions wherein said vanes are essentially parallel, in the same rotational direction but through angles different one from the other, in response to said turbo compressor tending to surge, so that the fluid inducted through said induction port is caused to impinge on said compressor wheel with a uniform and reduced angle of incidence.

8. A turbo compressor comprising:
   an induction housing;
   a compressor wheel having an axis of rotation disposed in said induction housing;
   means defining an induction port in said induction housing which induction port lies on a plane which is non-intersecting with said axis of rotation;
   a plurality of uniformly shaped and sized pivotal vanes disposed across said induction port in a spaced relationship to each other;
   actuator means responsive to a detected operating parameter of said turbo compressor;
   a drive lever operatively connected to said actuator means, said drive lever having a slot formed therein;
   a plurality of links each connected to one of said vanes, each of said links being different in length one from the other; and
   a connecting arm pivotally interconnecting each of said links, said connecting arm being formed with a pin at one end thereof which pin is slidably received in said slot.

* * * * *